United States Patent
Suehiro et al.

(10) Patent No.: US 9,899,871 B2
(45) Date of Patent: Feb. 20, 2018

(54) ISLANDED OPERATING SYSTEM

(71) Applicants: Sanken Electric Co., Ltd., Niiza-shi, Saitama (JP); DENSO CORPORATION, Kariya-shi, Aichi (JP)

(72) Inventors: Yutaka Suehiro, Niiza (JP); Tetsuya Ueda, Niiza (JP); Shizuo Tsuchiya, Gifu (JP); Atsushi Mise, Nagoya (JP)

(73) Assignees: Sanken Electric Co., Ltd., Niiza-shi (JP); DENSO CORPORATION, Kariya-shi (JP)

( * ) Notice: Subject to any disclaimer, the term of this patent is extended or adjusted under 35 U.S.C. 154(b) by 455 days.

(21) Appl. No.: 14/630,758

(22) Filed: Feb. 25, 2015

(65) Prior Publication Data

US 2015/0244209 A1 Aug. 27, 2015

(30) Foreign Application Priority Data

Feb. 26, 2014 (JP) .................................. 2014-034908

(51) Int. Cl.
*H02J 7/35* (2006.01)
*H02J 9/06* (2006.01)
*H02J 7/00* (2006.01)

(52) U.S. Cl.
CPC ............ *H02J 9/061* (2013.01); *H02J 7/0013* (2013.01); *H02J 7/35* (2013.01); *Y10T 307/62* (2015.04)

(58) Field of Classification Search
CPC Y10T 307/50; H02J 3/005; H02J 9/00; Y02E 10/50
(Continued)

(56) References Cited

U.S. PATENT DOCUMENTS 5,994,794 A * 11/1999 Wehrlen .................. H02J 9/066
307/64
7,112,891 B2 * 9/2006 Johnson ............ H01M 8/04089
180/65.31
(Continued)

FOREIGN PATENT DOCUMENTS

JP 2008-035665 A 2/2008
JP 2008-278700 A 11/2008
(Continued)

OTHER PUBLICATIONS

Office Action dated Feb. 7, 2017 in the counterpart Japanese patent application.

*Primary Examiner* — Daniel Kessie
(74) *Attorney, Agent, or Firm* — Metrolexis Law Group, PLLC

(57) ABSTRACT

The invention includes: charging/discharging devices including storage batteries and having a grid-connected function to perform charging/discharging operations on an electric power system and an islanded-operation function to supply the electric power system with a constant-voltage constant-frequency electric power; a monitor detects an electric power state of the charging/discharging device and to transmit detection output to the charging/discharging device; and a switching unit connects and disconnects commercial power source to and from electric power system. When a commercial power source is normal, the switching unit connects the commercial power source to the electric power system and charging/discharging devices establish a grid connection. When commercial power source fails, switching unit disconnects commercial power source from electric power system, charging/discharging device performs an islanded operation, and charging/discharging device performs a charging/discharging operation according (Continued)

to a detection output of monitor and performs control so that islanded operation electric power of charging/discharging device becomes constant.

6 Claims, 7 Drawing Sheets

(58) Field of Classification Search
USPC ................. 307/43, 48, 57, 65, 66, 71, 78
See application file for complete search history.

(56) References Cited

U.S. PATENT DOCUMENTS

| | | | | |
|---|---|---|---|---|
| 8,901,866 B2* | 12/2014 | Sakai | ................. | H02J 3/30 307/66 |
| 2011/0133556 A1* | 6/2011 | Choi | ................. | H02J 3/383 307/65 |
| 2011/0213999 A1* | 9/2011 | Lecourtier | ............. | G06F 1/263 713/324 |
| 2012/0228944 A1* | 9/2012 | Koshin | ................. | H01M 10/44 307/66 |
| 2012/0283890 A1* | 11/2012 | Fu | ............. | H02J 3/14 700/295 |
| 2014/0183949 A1* | 7/2014 | Murano | ................. | G05F 1/67 307/24 |
| 2014/0200722 A1* | 7/2014 | Bhavaraju | ............... | H02J 3/381 700/286 |
| 2014/0214223 A1* | 7/2014 | Tsunoda | ................. | H02J 3/24 700/292 |
| 2014/0217826 A1* | 8/2014 | Oguchi | ................. | H02J 7/35 307/46 |
| 2014/0306533 A1* | 10/2014 | Paquin | ................. | H02J 3/383 307/52 |
| 2014/0319914 A1* | 10/2014 | Nomura | ................. | H02J 3/32 307/48 |
| 2014/0337002 A1* | 11/2014 | Manto | ................. | G06Q 50/06 703/18 |
| 2015/0108833 A1* | 4/2015 | Ito | ................. | H02J 3/383 307/23 |
| 2015/0270745 A1* | 9/2015 | Ogura | ................. | H02J 3/383 307/66 |

FOREIGN PATENT DOCUMENTS

| | | |
|---|---|---|
| JP | 2009-131056 A | 6/2009 |
| JP | 2013-121205 A | 6/2013 |
| JP | 2013-162686 A | 8/2013 |

* cited by examiner

ISLANDED OPERATING SYSTEM

TECHNICAL FIELD

The present invention relates to an islanded operating system capable of an islanded operation. Particularly, the present invention relates to an energy management system including a distributed power source, a storage battery system, and so forth, and being capable of stably supplying electric power to a load even when a commercial power source fails.

BACKGROUND ART

Recently, as represented by photovoltaic power generation systems and fuel cell systems, in the field of energy production, the development of distributed power sources have been active and accelerated for the practical applications. Further, a storage battery system configured to store electric power generated at a distributed power source and night-time electric power and discharge the stored electric power during the peak electric power demand to achieve energy leveling is about to be put into practical use.

FIG. 1 is a configuration diagram of a conventional islanded operating system. FIG. 1 shows one configuration example of energy management systems, such as HEMS (home energy management system) and BEMS (building energy management system), including a commercial power source, an electricity meter, a distributed power source, a load, and a controller. Distributed power sources establish a grid connection in accordance with the phase of a commercial power source. A photovoltaic power generation system capable of reverse power flow discharges electric power according to the amount of incident sunlight, and reverses the flow to the system when electricity is generated in an amount equal to or larger than the load, so that the electricity can be sold (Japanese Patent Application Publication No. 2009-131056).

Moreover, a fuel cell system incapable of reverse power flow is managed to consume generated electric power using a load, while a storage battery system is managed to store extra electricity from distributed power source and discharge the electricity so that the energy can be used efficiently.

Further, for a blackout, the output of each distributed power source is provided with an output dedicated to an islanded operation as disclosed in Japanese Patent Application Publication No. 2009-131056.

A distributed power source in FIG. 1 establishes a grid connection in synchronism with a commercial voltage. Hence, when a commercial power source has a blackout, over-voltage, or over-frequency, the grid-connected operation is terminated. In addition, during a blackout, an islanded operation output (mainly single-phase two-wire AC distribution at 100 V) can be used at a socket which is provided to the distributed power source independently of the grid connection.

However, in order to use the islanded operation output during a blackout, a load device has to be connected to the dedicated socket of each distributed power source. Besides, the load device cannot be operated by the energy management that is optimal for receiving electricity from the commercial power source.

Furthermore, an islanded operation output with a CVCF (constant voltage constant frequency) inverter configured to perform PWM control has a larger load. When a non-linear load is connected, the voltage is greatly distorted, so that other distributed power sources are also adversely influenced.

The present invention provides an islanded operating system configured to disconnect from a commercial power source when the commercial power source fails, and capable of supplying a load with a low-distortion voltage source by an islanded operation.

SUMMARY OF INVENTION

The present invention includes: an electric power system configured to supply a load with an electric power from a commercial power source; first monitoring device for detecting a failure of the commercial power source; first and second charging/discharging devices including storage batteries and having a grid-connected function to perform charging/discharging operations on the electric power system and an islanded-operation function to supply the electric power system with a constant voltage constant frequency electric power; second monitoring device for detecting an electric power state of the first charging/discharging device and transmitting detection output to the second charging/discharging device; and switching device for connecting and disconnecting the commercial power source to and from the electric power system. When the commercial power source is normal, the switching device connects the commercial power source to the electric power system, and the first and the second charging/discharging devices establish a grid connection. When the commercial power source fails, the switching device disconnects the commercial power source from the electric power system, the first charging/discharging device performs an islanded operation, and the second charging/discharging device performs a charging/discharging operation according to the detection output of the second monitoring device and performs control in such a manner as to make constant an islanded operation electric power of the first charging/discharging device.

A second aspect of the invention further includes multiple different types of distributed power sources each configured to supply the electric power system with an electric power. Each of the first and the second charging/discharging devices has a grid connection switch configured to be connected to the electric power system during a grid connection, and an islanding switch configured to be connected to the electric power system during an islanded operation. The electric power system has a first line connecting the multiple distributed power sources, the grid connection switches, and the load to each other, and a second line connecting the islanding switches to each other. When the commercial power source is normal, the first and the second charging/discharging devices open the islanding switches, and close the grid connection switches for charging/discharging operations, while the switching device connects the commercial power source and the first line. When the commercial power source fails, the first charging/discharging device opens the grid connection switch, and closes the islanding switch to output the electric power by the islanded operation, and the second charging/discharging device closes the grid connection switch and opens the islanding switch to perform the charging/discharging operation according to the second monitoring device, while the switching device connects the first line and the second line.

A third aspect of the invention is that when the commercial power source fails, the second charging/discharging device further operates in such a manner that the islanded operation electric power of the first charging/discharging device is discharged at a low output level.

A fourth aspect of the invention further includes third monitoring device for detecting an electric power state of second charging/discharging device and transmitting the detection output to the first charging/discharging device. The first and the second charging/discharging devices switch between the islanded operation and the charging/discharging operation based on charged amounts of the storage batteries.

A fifth aspect of the invention is that inputs and outputs of the first and the second charging/discharging devices are connected to islanded operation outputs thereof with a transformer.

A sixth aspect of the invention is that the multiple distributed power sources include a distributed power generation system capable of reverse power flow and a load-following power generation system incapable of reverse power flow. The distributed power generation system capable of reverse power flow controls the first and the second charging/discharging devices in such a manner that reverse power flow occurs.

A seventh aspect of the invention further includes, in place of the first monitoring device, first and second selector switches respectively capable of switching connections of grid connection outputs of the first and the second charging/discharging devices to any one of the commercial power source and the electric power system.

According to the first aspect of the invention, when the commercial power source fails, the second charging/discharging device performs control in such a manner as to make constant the electric power outputted by the first charging/discharging device. This makes it possible to supply the load with an islanded operation voltage having a low distortion.

According to the second aspect of the invention, the first line serves for the commercial power source and the second line serves for the islanded operation output of the charging/discharging device by using, between the commercial power source and the electric power system, not a breaker configured to turn on and off two wires, but the switching device configured to select one of two wires. This surely prevents a commercial bus and an islanded operation bus from being connected to each other even if the switching unit has a failure. Thus, no short circuit is caused in the voltage source. Moreover, even if any of the switching unit and the switches provided at the outputs of the charging/discharging devices is in an abnormal, stuck state, controlling them results in no impediment. Further, controlling the switches of the charging/discharging devices makes it possible to share the same bus, and the islanded operation outputs of the first and the second charging/discharging devices can be connected to a system by using the smallest number of switching units selected.

According to the third aspect of the invention, operating the second charging/discharging device in such a manner that the first charging/discharging device discharges a small quantity of electric power makes it possible to output an islanded operation voltage having an extremely low distortion.

According to the fourth aspect of the invention, switching the operation modes in accordance with the SOC (state of capacity) of the storage batteries of the first and the second charging/discharging devices makes it possible to maintain the state of the electric power system stable for a long period.

According to the fifth aspect of the invention, in a case where the islanded operation outputs of the first and the second charging/discharging devices are each a single-phase two-wire system, connecting the commercial transformer including single-phase two wires and single-phase three wires thereto enables a connection to a single-phase three-wire system. Moreover, even when reverse power flow occurs only to one phase on the single-phase three-wire side of the transformer, an electric power is converted by the single-phase two wires. This makes is possible to absorb the electric power even if inverters have a full-bridge configuration.

According to the sixth aspect of the invention, in a case where the amount of electricity generated by the distributed power generation system capable of reverse power flow, such as a photovoltaic power generation system, of the multiple distributed power sources is larger than the electric power supplied to the load, electric powers charged to the first and the second charging/discharging devices are maintained or increased to control the reverse-flowing electric power; meanwhile, in a case where the amount of electricity generated by the load-following power generation system incapable of reverse power flow of the multiple distributed power sources is larger than the electric power supplied to the load, the first and the second charging/discharging devices reduce the output to be discharged and supply the load with the amount of electricity generated by the load-following power generation system, thus performing control in such a manner as to prevent reverse power flow.

According to the seventh aspect of the invention, since the state of the commercial power source can be determined by a voltage sensor of the first charging/discharging device, the first monitoring device is not necessary.

DESCRIPTION OF EMBODIMENTS

Hereinafter, embodiments of an islanded operating system of the present invention will be described in detail with reference to the drawings.

Embodiment 1

Figure 1:
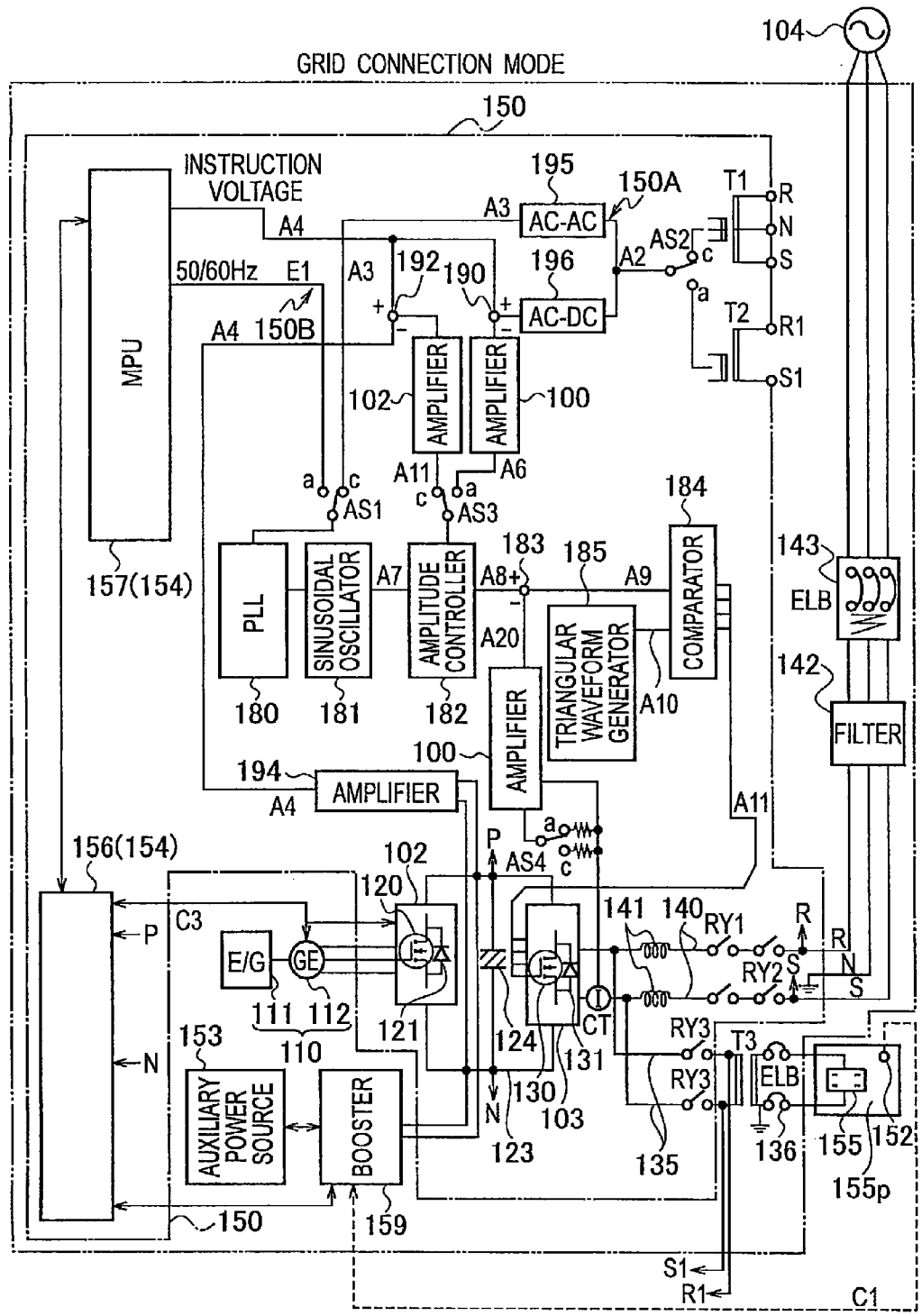
FIG. 1 is a configuration diagram of a conventional islanded operating system.
Figure 2:
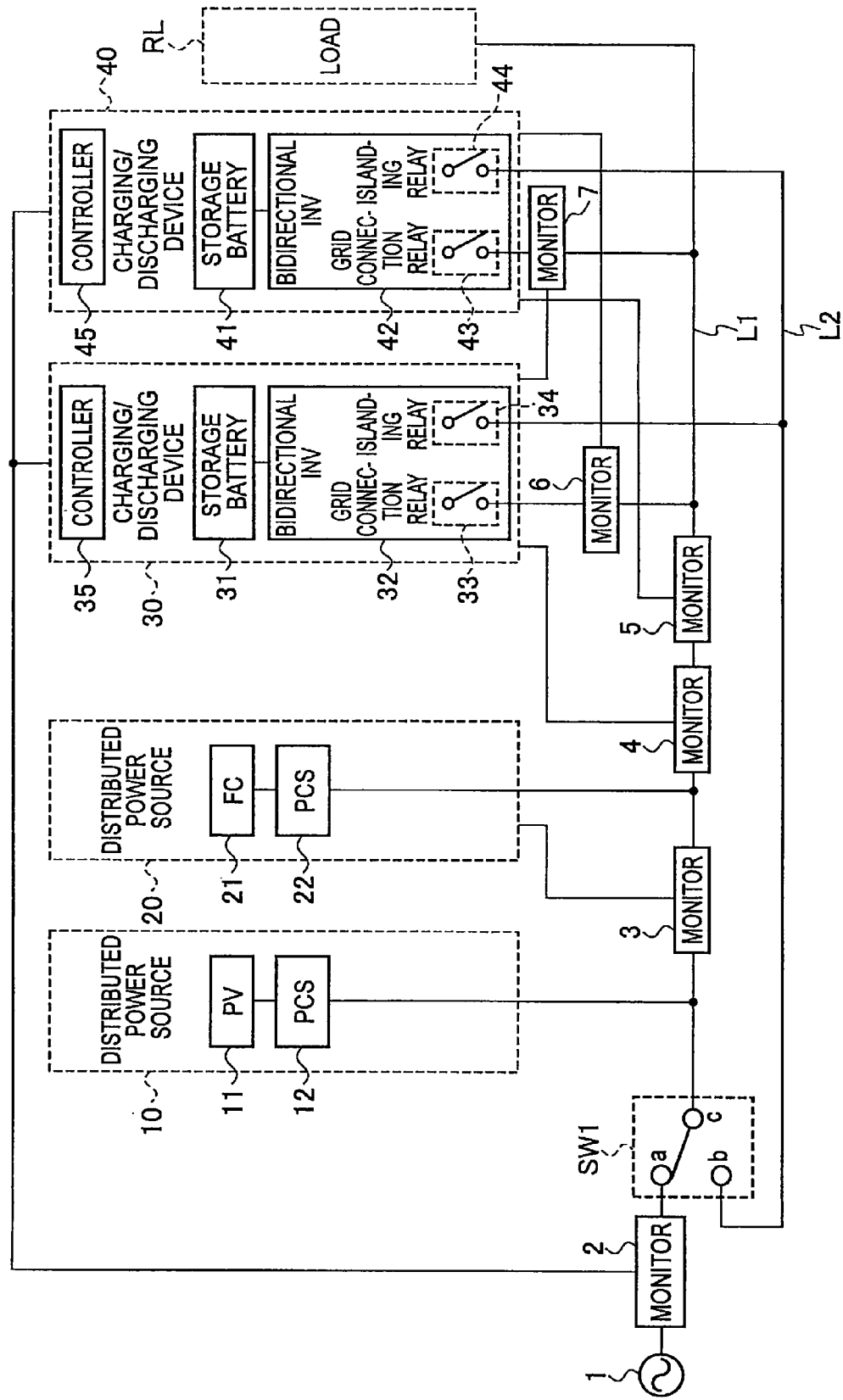
FIG. 2 is a configuration diagram of an islanded operating system according to Embodiment 1 of the present invention.

FIG. 2 is a configuration diagram showing an islanded operating system according to Embodiment 1 of the present invention. In FIG. 2, the islanded operating system includes a commercial power source 1, monitors 2 to 7, distributed power sources 10, 20, charging/discharging devices 30, 40, and a switching unit SW1. The distributed power source 10 is capable of reverse power flow and includes a solar cell PV11 and a power conditioner system PCS12. The distributed power source 20 is incapable of reverse power flow and includes FC21 and a power conditioner system PCS22.

The charging/discharging devices 30, 40 have a grid-connected function to perform charging/discharging operations on an electric power system configured to supply a load RL with an electric power from the commercial power source 1, and an islanded-operation function to supply the electric power system with a constant-voltage constant-frequency electric power. The charging/discharging device 30 (first charging/discharging mean) includes a storage battery 31, a bidirectional inverter (bidirectional INV) 32, a grid connection relay 33, an islanding relay 34, and a controller 35. The charging/discharging device (second charging/discharging mean) 40 includes a storage battery 41, a bidirectional INV 42, a grid connection relay 43, an islanding relay 44, and a controller 45. The grid connection relays 33, 43 are each a grid connection switch configured to be connected to the electric power system during a grid connection. The islanding relays 34, 44 are each an islanding switch configured to be connected to the electric power system during an islanded operation.

The monitor 2 (first monitoring device) is configured to measure an electric power of the commercial power source 1 and to detect a failure of the commercial power source 1. The monitor 6 (second monitoring device) is configured to detect an electric power state of the charging/discharging device 30 and to transmit the detection output to the charging/discharging device 40. The monitors 3 to 5 are connected between the switching unit SW1 and the load RL. The monitor 3 is configured to measure an electric power for adjusting electric power to prevent reverse power flow to the distributed power source 20 incapable of reverse power flow.

The switch (switching device) SW1 is configured to connect and disconnect the commercial power source 1 to and from the electric power system. The electric power system has: a first line L1 connecting the distributed power sources 10, 20, the grid connection switches 33, 43, and the load RL to each other; and a second line L2 connecting the islanding switches 34, 44 to each other.

When the commercial power source 1 is normal, the switching unit SW1 connects the commercial power source 1 to the electric power system, and the charging/discharging devices 30, 40 establish a grid connection. When the commercial power source 1 fails, the switching unit SW1 disconnects the commercial power source 1 from the electric power system, and the charging/discharging device 30 performs an islanded operation, and the charging/discharging device 40 performs a charging/discharging operation according to a detection output of the monitor 6 and performs control in such a manner as to make constant the islanded operation electric power of the charging/discharging device 30.

Moreover, when the commercial power source 1 is normal, the charging/discharging devices 30, 40 open the is landing relays 34, 44, and close the grid connection relays 33, 43 for charging/discharging operations. The switching unit SW1 connects the commercial power source 1 and the first line L1.

When the commercial power source 1 fails, the charging/discharging device 30 opens the grid connection relay 33 to disconnect from the electric power system, and closes the islanding relay 34 to output a constant voltage of a CVCF operation by the islanded operation. The charging/discharging device 40 closes the grid connection relay 43, and opens the islanding relay 44 to perform the charging/discharging operation according to the monitor 6. The switching unit SW1 connects the first line L1 and the second line L2. This makes it possible to supply the islanded operation output to the outside.

When the commercial power source 1 fails, the switching unit SW1 switches to the islanded operation output. The switching unit SW1 can be replaced with a switch if the islanded operation output is outputted from the grid connection relays 33, 43. However, in a case where the switch fails while being closed, an electric power is supplied to a commercial power source system, so that the power source recovering worker may have a risk of electric shock. Providing the switching unit SW1 and the islanded operation output separately makes it possible to prevent the electric power from being supplied to the commercial power source 1 even when the commercial power source 1 fails.

Next, description will be given of the operation at the time when the commercial power source 1 is connected to the power source system. The load RL is supplied with an electric power from the commercial power source 1. Nevertheless, when the distributed power source 10 generates power by the photovoltaic power generation, the electric power of the distributed power source 10 is supplied to the load RL, decreasing a forward-flowing electric power from the commercial power source 1. In addition, when the electric power generated by the distributed power source 10 is larger than the electric power consumed by the load RL, the storage batteries 31, 41 of the charging/discharging devices 30, 40 are charged, or the electricity can be sold by reversing the flow to the commercial power source 1.

When the distributed power source 20 generates power at the fuel cell also, the electric power is supplied to the load RL, decreasing the forward-flowing electric power from the commercial power source 1. When the amount of electricity generated is larger than the capacity of the load RL, the reverse power flow is possible in the case of sunlight, but the fuel cell is incapable of the reverse power flow. For this reason, the amount of electricity generated needs to be controlled in accordance with the load amount, and the control is performed according to the monitor 3 in such a manner as to prevent reverse power flow.

The charging/discharging devices 30, 40 are incapable of reverse power flow similarly to the distributed power source 20. For this reason, the output-reducing control is performed according to the monitors 3, 4 in such a manner as to prevent reverse power flow. Since the storage batteries 31, 41 are provided, this enables charging while electric power is generated using sunlight or the fuel cell, and discharging when the load amount is large, so that the peak demand of the commercial power source 1 can be reduced.

Next, description will be given of the operation at the time when the commercial power source 1 fails. In a case where the commercial power source 1 is in an abnormal state (blackout, over-voltage, under/over-frequency), the switching unit SW1 disconnects the commercial power source 1 and connects the electric power system to the islanded operation outputs of the charging/discharging devices 30, 40. The charging/discharging device 30 closes the islanding relay 34 to output a CVCF sine wave, and the charging/discharging device 40 closes the grid connection relay 43 to perform a charging operation or discharging operation with a power factor of 1. Moreover, in order to prevent reverse power flow to the charging/discharging device 30, information of the monitor 6 is used to control the charging/discharging device 40. In order to prevent reverse power flow to the charging/discharging device 40, information of the monitor 7 is used to control the charging/discharging device 30.

The charging/discharging device 30 performing the CVCF operation plays a role of a system. However, when a relation of the load capacity<the capacity of the distributed power sources 10, 20 is satisfied, the electric power generated by the distributed power sources 10, 20 reverse-flows to the charging/discharging device 30. Although the storage batteries 31, 41 are charged, this flow has to be stopped when a relation of the reverse-flowing electric power>the capacity of the charging/discharging device 30 is established and the storage battery of the charging/discharging device 30 is fully charged.

Hence, even if reverse power flow to the charging/discharging device 30 occurs using the charging/discharging device 40, a control is performed by charging the charging/discharging device 40 using the monitor 6 in such a manner that the charging/discharging device 30 discharges a small quantity of electric power all the time. The direction of the electric power can be seen from the monitor 6. Accordingly, provided that a direction in which the charging/discharging device 30 discharges electricity is a forward direction, when the electric power discharged from the charging/discharging device 30 is smaller than a reference amount of the electric power discharged in a small quantity and reverse power flow occurs, the electric power reverse-flowing to the charging/discharging device 30 is drawn to the charging/discharging device 40 by the charging operation, thereby avoiding the reverse power flow.

In this manner, when the amount of electricity generated by the distributed power sources 10, 20 is larger than the capacity of the charging/discharging device, the charging/discharging device 40 is charged, thereby enabling the operation to continue.

Suppose a case where the amount of electricity generated by the distributed power sources 10, 20 is small, the load is large, and the load capacity is larger than the capacity of the charging/discharging devices 30, 40. In this case, the is landed operation output may be stopped due to the overload. Hence, a control is performed by discharging the charging/discharging device 40 using the monitor 6 in such a manner that the charging/discharging device 30 discharges a small quantity of electric power all the time. Since the direction of the electric power can be seen from the monitor 6 provided that the direction in which the charging/discharging device 30 discharges electricity is a forward direction, when the discharged electric power exceeds a reference amount of the electric power discharged in a small quantity, the electric power discharged from the charging/discharging device 30 is reduced by the discharging operation of the charging/discharging device 40. In this manner, when the capacity of the charging/discharging devices is larger than the amount of electricity generated by the distributed power sources 10, 20 but smaller than the capacity load, the charging/discharging device 40 discharges electricity, thereby enabling the operation to continue.

Moreover, another effect of reducing the islanded operation output of the charging/discharging device 30 by charging/discharging the charging/discharging device 40 is to produce a high-quality, low-distortion sinusoidal voltage. A general CVCF inverter having a larger load is likely to have a sinusoidal waveform distorted. Hence, the islanded operation output is made into a low-load state all the time by controlling the charging/discharging device 40, thereby making it possible to supply a sinusoidal voltage having a low distortion.

Note that it is a matter of course that the charging/discharging device 40 may be configured to perform the islanded operation while the charging/discharging device 30 is configured to perform the charging/discharging operation. The functions may be changed according to the charged amounts of the storage batteries.

As described above, according to Embodiment 1, installing the monitor 2 between the commercial power source 1 and the electric power system makes it possible to determine whether the system is normal or abnormal. Moreover, when the commercial power source 1 fails, the switching unit SW1 disconnects the commercial power source 1 from the electric power system, the charging/discharging device 30 performs an islanded operation, and the charging/discharging device 40 performs a charging/discharging operation according to a detection output of the monitor 6 and performs control in such a manner as to make constant the islanded operation electric power of the charging/discharging device 30. This makes it possible to supply the load RL with an islanded operation voltage having a low distortion.

Further, the first line L1 serves for the commercial power source 1 and the second line L2 serves for the islanded operation output of the charging/discharging device 30 by using, between the commercial power source 1 and the electric power system, not a breaker configured to turn on and off two wires, but the switching unit SW1 configured to select one of two wires. This surely prevents a commercial bus and an islanded operation bus from being connected to each other even if the switching unit SW1 has a failure. Thus, no short circuit is caused in the voltage source. In addition, even if any of the switching unit SW1 and the switches 33, 34, 43, 44 of the charging/discharging devices 30, 40 is in an abnormal, stuck state, controlling them results in no impediment. Furthermore, controlling the switches 33, 34, 43, 44 of the charging/discharging devices 30, 40 makes it possible to share the same bus, and the islanded operation outputs of the charging/discharging devices 30, 40 can be connected to a system by using the smallest number of switching units selected.

Furthermore, operating the charging/discharging device 40 in such a manner that the charging/discharging device 30 discharges a small quantity of electric power makes it possible to output an islanded operation voltage having an extremely low distortion.

Furthermore, in general, the larger the load of an islanded operation output of charging/discharging devices, the larger the voltage distortion, adversely influencing a distributed power source connected to the islanded operation output. Accordingly, while the is landing-operating charging/discharging device is absorbing an energy (a state of Wr<Wp, where Wr is an electric power of the load, and Wp is an electric power of a distributed power source), adjusting the other charged/discharged electric power can make the absorbing state of the charging/discharging device 30 closer to 0 with the charging/discharging device 40 in a charging mode.

Furthermore, while the islanding-operating charging/discharging device is discharging an energy (a state of Wr>Wp), a voltage distortion can be reduced by making the islanded operation output closer to a zero load state with the charging/discharging device 40 in a discharging mode.

Furthermore, switching between an islanded operation mode and a charging/discharging operation mode in accordance with the SOC state of the storage batteries of the charging/discharging devices 30, 40 makes it possible to maintain the state of the electric power system stable for a long period.

Furthermore, in a case where the amount of electricity generated by a distributed power generation system capable of reverse power flow, such as a photovoltaic power generation system, of the multiple distributed power sources 10, 20 is larger than the electric power supplied to the load, electric powers discharged from the charging/discharging devices 30, 40 are maintained or increased to control the reverse-flowing electric power; meanwhile, in a case where the amount of electricity generated by a load-following power generation system incapable of reverse power flow of the multiple distributed power sources 10, 20 is larger than the electric power supplied to the load, the charging/discharging devices 30, 40 reduce the output to be discharged and supply the load with the amount of electricity generated by the load-following power generation system, thus performing control in such a manner as to prevent reverse power flow.

Embodiment 2

Figure 3:
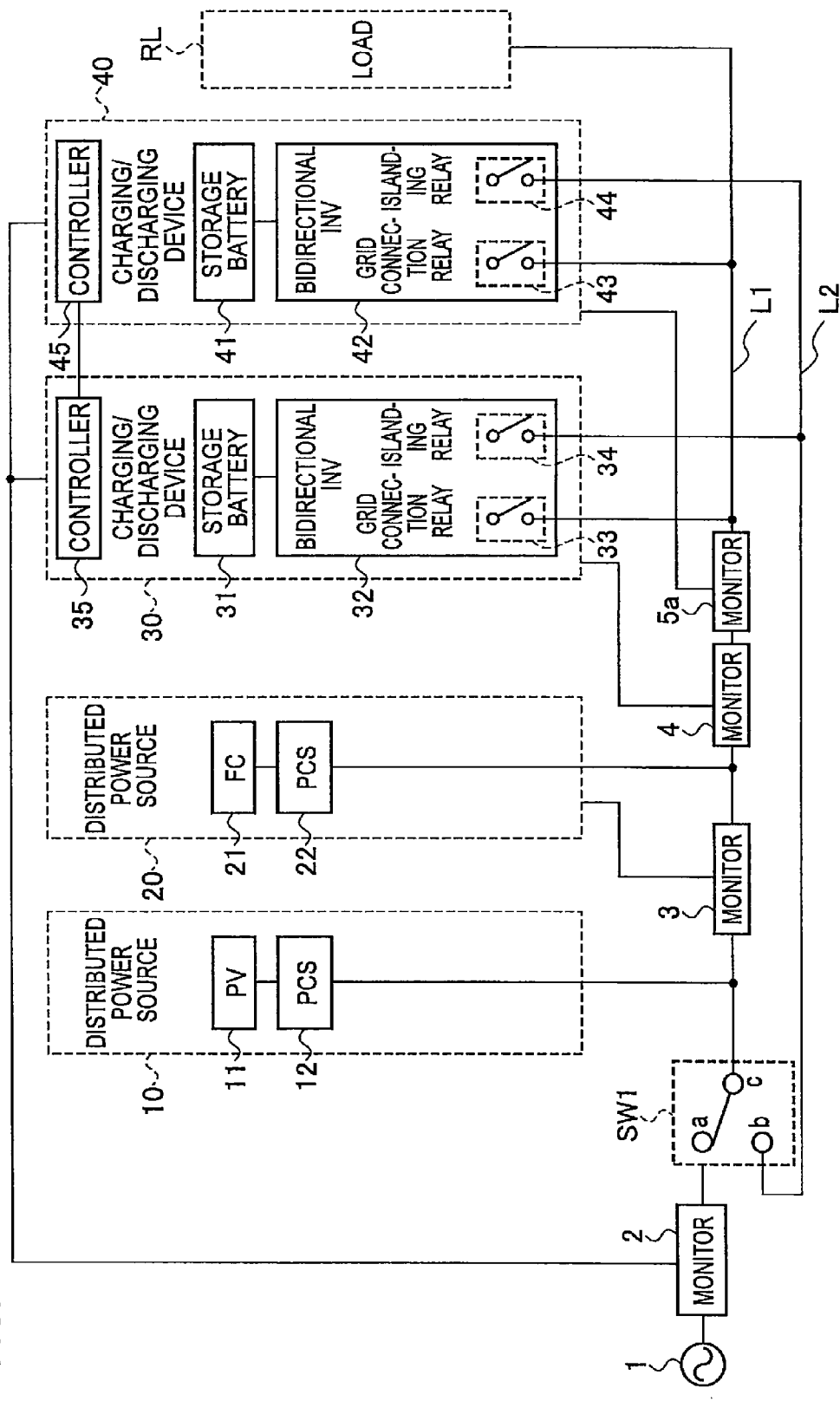
FIG. 3 is a configuration diagram of an islanded operating system according to Embodiment 2 of the present invention.

FIG. 3 is a configuration diagram showing an islanded operating system according to Embodiment 2 of the present invention. Description will be given of a case where a commercial power source 1 in FIG. 3 fails. In the case where the commercial power source 1 is in an abnormal state (blackout, over-voltage, under/over-frequency), a switching unit SW1 disconnects the commercial power source 1, and connects an electric power system to the islanded operation output of charging/discharging devices 30, 40. The charging/discharging device 30 closes an islanding relay 34 and outputs a CVCF sine wave. The charging/discharging device 40 closes the grid connection relay 43 and performs a charging operation or discharging operation with a power factor of 1.

In Embodiment 1, even if reverse power flow to the charging/discharging device 30 occurs, a control is performed by charging the charging/discharging device 40 using the monitor 6 in such a manner that the charging/discharging device 30 discharges a small quantity of electric power all the time.

In contrast, in Embodiment 2, a controller 35 configured to control the charging/discharging device 30 is provided to the charging/discharging device 30, and a controller 45 configured to control the charging/discharging device 40 is provided to the charging/discharging device 40. The controllers 35 and 45 communicate with each other and thereby obtain state amounts of the both, and control the charging/discharging device 40 based on the obtained state amounts in such a manner that the charging/discharging device 30 discharges a small quantity of electric power all the time.

Furthermore, in Embodiment 2 also similarly to Embodiment 1, the charging/discharging device 40 may be configured to perform the islanded operation, while the charging/discharging device 30 is configured to perform the charging/discharging operation, depending on the charged amounts of the storage batteries.

Note that, in Embodiment 2, since the controllers 35 and 45 communicating with each other obtain the state amounts of the both, the charging/discharging devices 30, 40 do not need monitors 6 and 7 for obtaining the operation state of the other.

Embodiment 3

Figure 4:
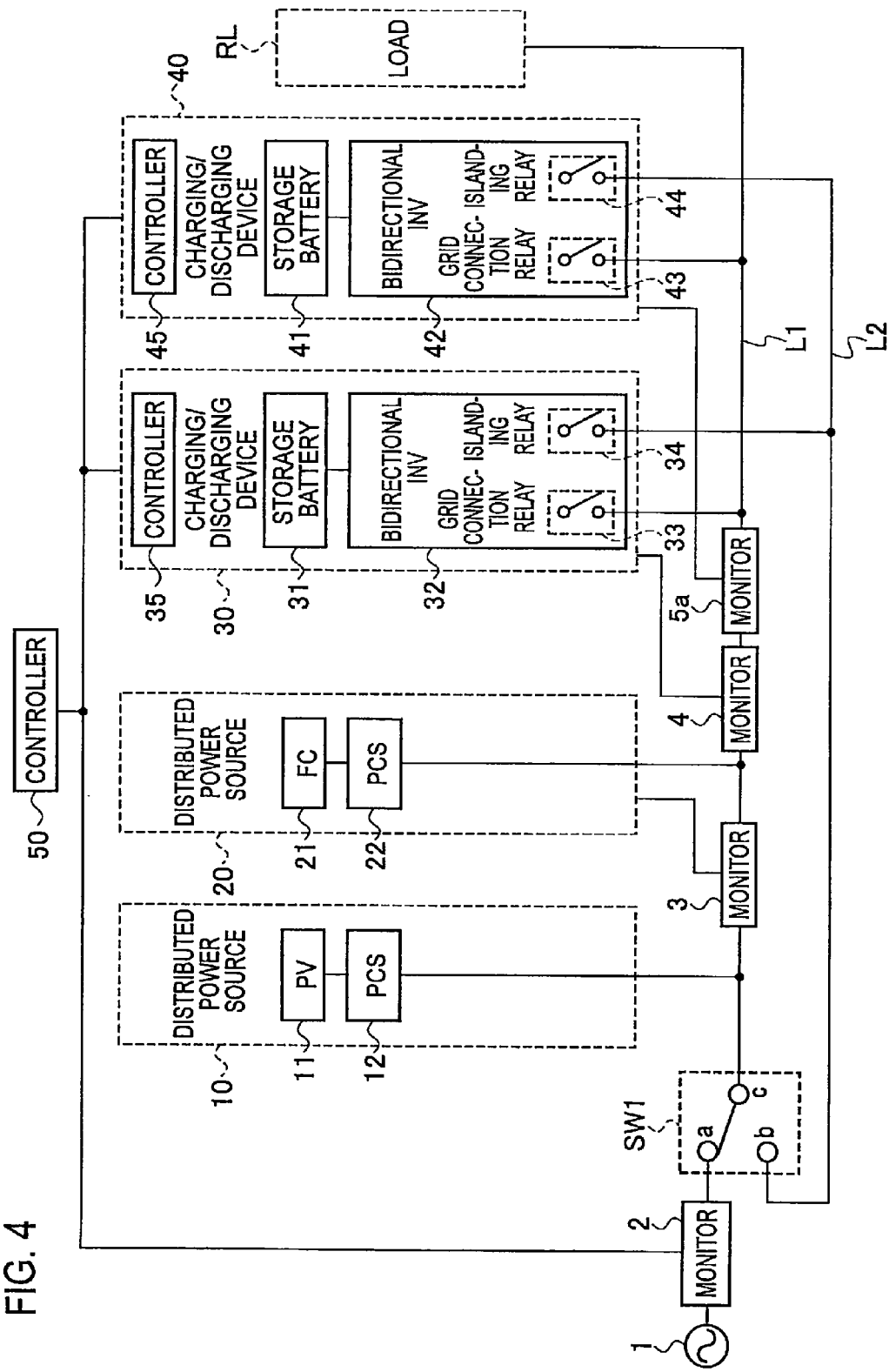
FIG. 4 is a configuration diagram of an islanded operating system according to Embodiment 3 of the present invention.

FIG. 4 is a configuration diagram showing an islanded operating system according to Embodiment 3 of the present invention. In Embodiment 2, the controllers 35 and 45 obtain the state amounts of the both by the communication, and control the charging/discharging device 40 in such a manner that the charging/discharging device 30 discharges a small quantity of electric power all the time.

In contrast, in Embodiment 3, a controller 50 is provided. The controller 50 is configured to receive, from a monitor 2, a detection signal of detecting the state of a commercial power source 1, judge the states of charging/discharging devices 30, 40, and control the charging/discharging device 40 in such a manner that the charging/discharging device 30 discharges a small quantity of electric power all the time.

Furthermore, in Embodiment 3 also similarly to Embodiments 1 and 2, the charging/discharging device 40 may be configured to perform the islanded operation, while the charging/discharging device 30 is configured to perform the charging/discharging operation, depending on the charged amounts of the storage batteries.

Note that, in Embodiment 3, the controller 50 receives a signal from the monitor 2 and sends control signals to controllers 35, 45. Accordingly the charging/discharging devices 30, 40 do not need monitors 6 and 7 for obtaining the operation state of the other.

Embodiment 4

Figure 5:
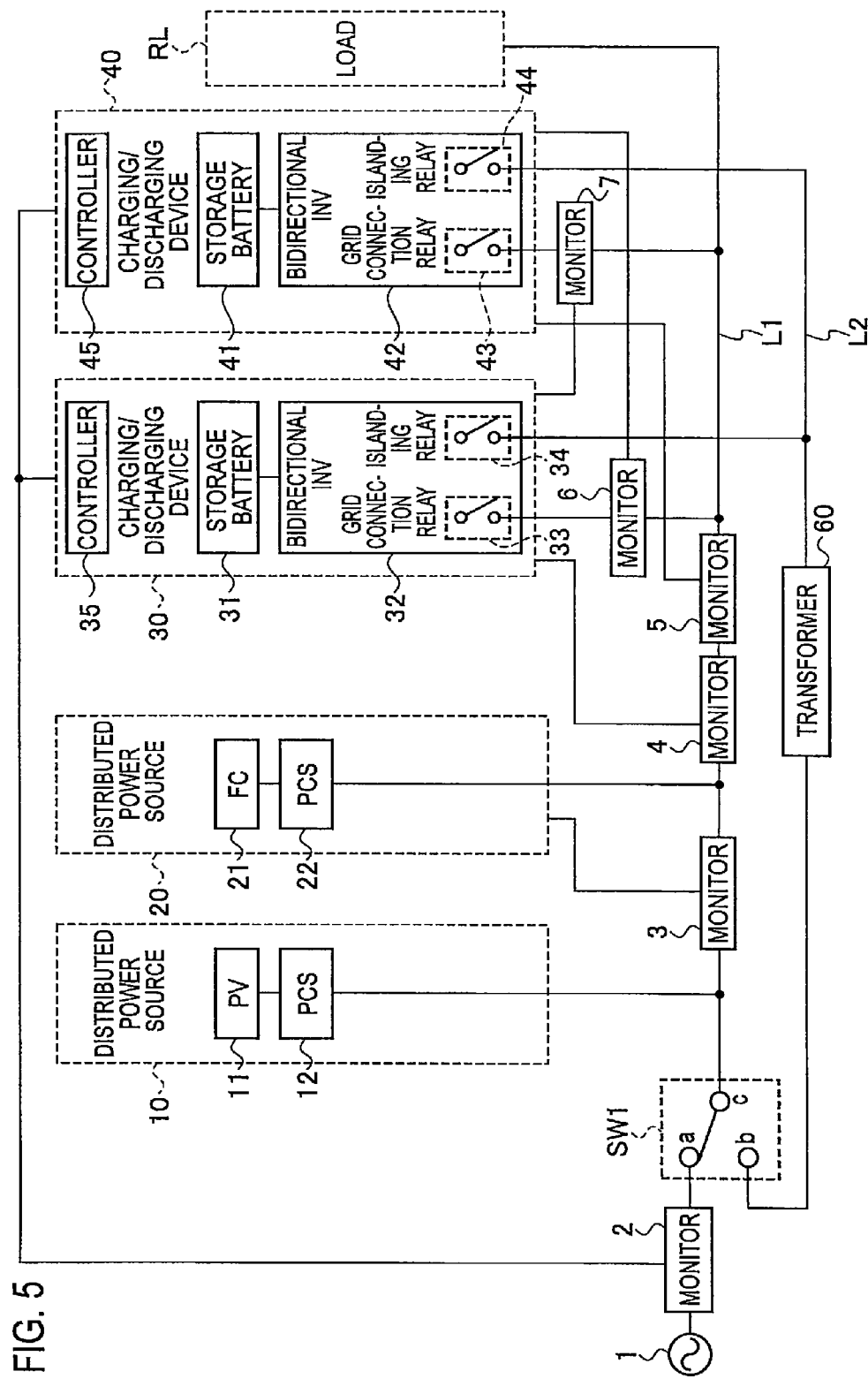
FIG. 5 is a configuration diagram of an islanded operating system according to Embodiment 4 of the present invention.
Figure 6:
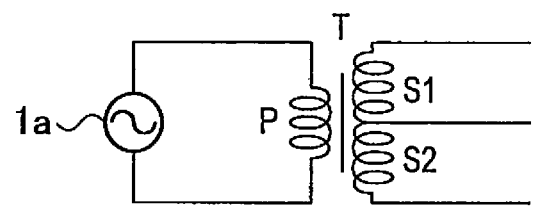
FIG. 6 is a configuration diagram of a transformer in the islanded operating system according to Embodiment 4 of the present invention.

FIG. 5 is a configuration diagram showing an islanded operating system according to Embodiment 4 of the present invention. A commercial transformer 60 including single-phase two wires and single-phase three wires is connected to the islanded operation outputs of charging/discharging devices 30, 40. FIG. 6 is a configuration diagram of the transformer 60 in the islanded operating system according to Embodiment 4 of the present invention. The transformer 60 includes a single-phase two-wire primary wiring P and single-phase three-wire secondary wirings S1, S2.

According to Embodiment 4, the transformer 60 enables a connection to a single-phase three-wire system. Moreover, even when reverse power flow occurs only to one phase on the single-phase three-wire side of the transformer 60, the electric power is converted by the single-phase two wires. This makes it possible to absorb the electric power even if the inverters have a full-bridge configuration.

Embodiment 5

Figure 7:
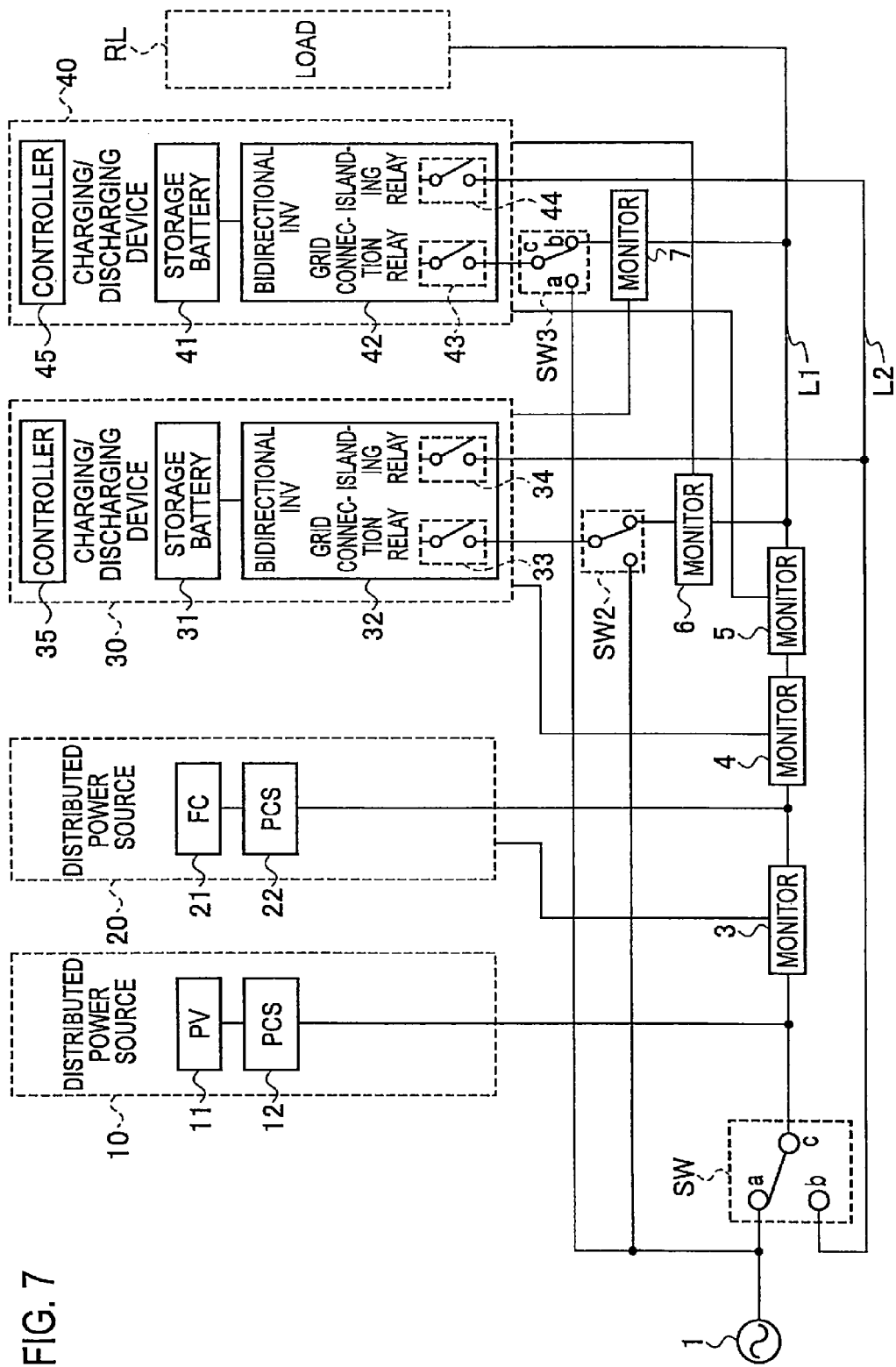
FIG. 7 is a configuration diagram of an islanded operating system according to Embodiment 5 of the present invention.

FIG. 7 is a configuration diagram showing an islanded operating system according to Embodiment 5 of the present invention. Embodiment 5 is characterized in that selector switches SW2, SW3 each capable of switching a connection to either a commercial power source 1 or the electric power system are respectively provided to the grid connection outputs of charging/discharging devices 30, 40.

When the charging/discharging device 30 performs the islanded operation and the charging/discharging device 40 performs the charging/discharging operation, the selector switch SW2 connects the grid connection output of the charging/discharging device 30 to the commercial power source side, and the selector switch SW3 switches the grid connection output of the charging/discharging device 40 to the electric power system.

In general, in a power conditioner system PCS, at the grid connection output is provided a voltage sensor. Since the state of the commercial power source can be determined by a voltage sensor of the charging/discharging device 30, no monitor 2 is necessary.

What is claimed is:

1. An islanded operating system comprising:
   an electric power system configured to supply a load with an electric power from a commercial power source;

first monitoring device for detecting a failure of the commercial power source;

a first charging/discharging device including a storage battery, and having a grid-connected function to perform a charging/discharging operation on the electric power system and an islanded-operation function to supply the electric power system with a constant-voltage constant-frequency electric power;

a second charging/discharging device having a grid-connected function to perform a charging/discharging operation on the electric power system and an islanded-operation function to supply the electric power system with a constant-voltage constant-frequency electric power, the second charging/discharging device constituted of at least one or more of parallel-connected charging/discharging devices each including a storage battery;

second monitoring device for detecting an electric power state of the first charging/discharging device and transmitting detection output to the second charging/discharging device;

switching device for connecting and disconnecting the commercial power source to and from the electric power system; and a plurality of different types of distributed power sources each configured to supply the electric power system with an electric power, wherein when the commercial power source is normal, the switching device connects the commercial power source to the electric power system, and the first and the second charging/discharging devices establish a grid connection, when the commercial power source fails, the switching device disconnects the commercial power source from the electric power system, the first charging/discharging device performs an islanded operation, and the second charging/discharging device performs a charging/discharging operation according to the detection output of the second monitoring device and performs control in such a manner as to make constant an islanded operation electric power of the first charging/discharging device, each of the first and the second charging/discharging devices has a grid connection switch configured to be connected to the electric power system during a grid connection, and an islanding switch configured to be connected to the electric power system during an islanded operation, the electric power system has a first line connecting the plurality of distributed power sources, the grid connection switches, and the load to each other, and a second line connecting the islanding switches to each other, when the commercial power source is normal, the first and the second charging/discharging devices open the islanding switches, and close the grid connection switches for charging/discharging operations, while the switching device connects the commercial power source and the first line, and when the commercial power source fails, the first charging/discharging device opens the grid connection switch, and closes the islanding switch to output the electric power by the islanded operation, and the second charging/discharging device closes the grid connection switch and opens the islanding switch to perform the charging/discharging operation according to the second monitoring device, while the switching device connects the first line and the second line.

2. The islanded operating system according to claim 1, wherein when the commercial power source fails, the second charging/discharging device further operates in such a manner that the islanded operation electric power of the first charging/discharging device is discharged at a low output level.

3. The islanded operating system according to claim 1, further comprising third monitoring device for detecting an electric power state of the second charging/discharging device and transmitting detection output to the first charging/discharging device, wherein
the first and the second charging/discharging devices switch between the islanded operation and the charging/discharging operation based on charged amounts of the storage batteries.

4. The islanded operating system according to claim 1, wherein inputs and outputs of the first and the second charging/discharging devices are connected to islanded operation outputs thereof with a transformer.

5. The islanded operating system according to claim 1, wherein
the plurality of distributed power sources include a distributed power generation system capable of reverse power flow and a load-following power generation system incapable of reverse power flow, and
the distributed power generation system capable of reverse power flow controls the first and the second charging/discharging devices in such a manner that reverse power flow occurs.

6. The islanded operating system according to claim 1, further comprising, in place of the first monitoring device, first and second selector switches respectively capable of switching connections of grid connection outputs of the first and the second charging/discharging devices to any one of the commercial power source and the electric power system.

* * * * *